June 30, 1959  W. F. RICHMOND, JR., ET AL  2,892,907
SWITCHING SYSTEM
Filed Jan. 19, 1956  2 Sheets-Sheet 1
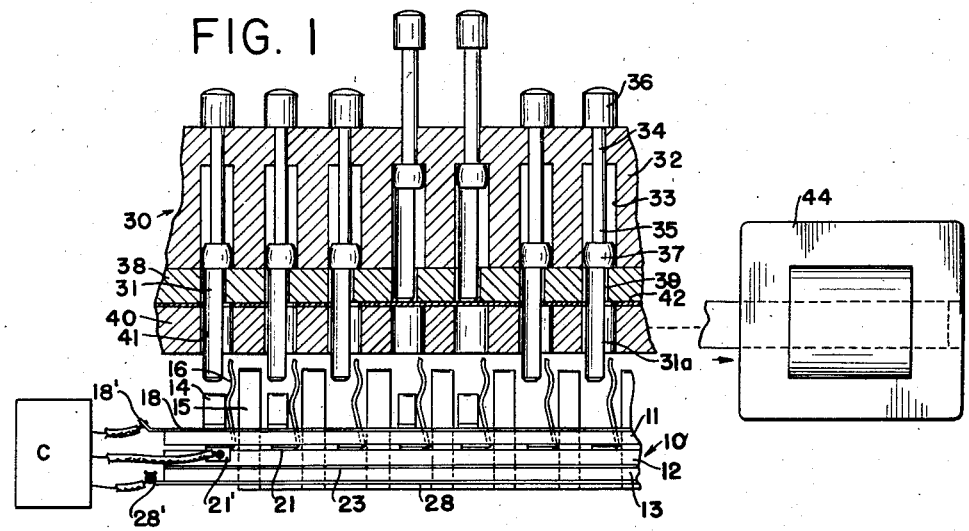
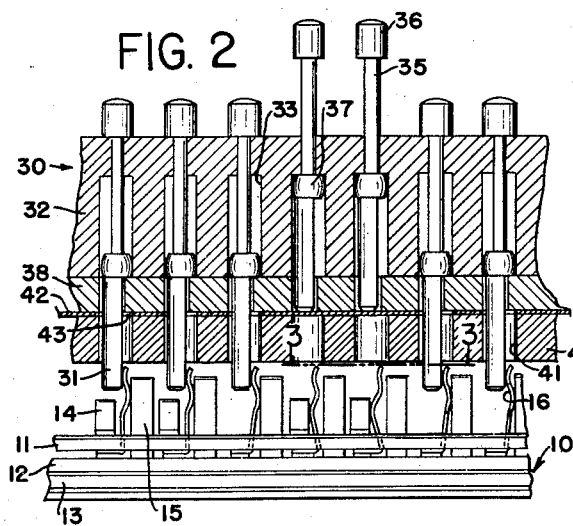
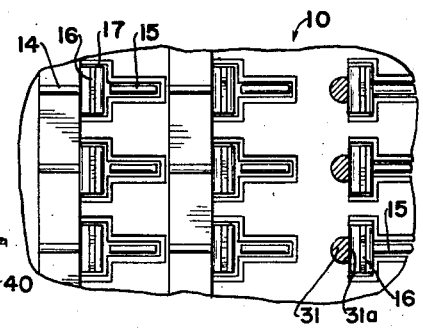
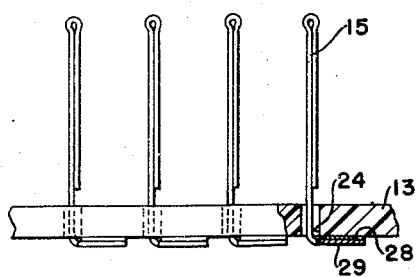
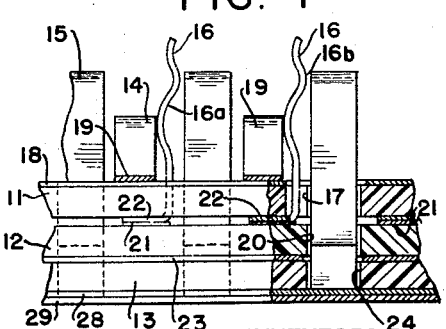
INVENTORS
WILLIAM F. RICHMOND JR.
DAVID C. NOWACK
BY
Julian C. Renfro
ATTORNEY June 30, 1959   W. F. RICHMOND, JR., ET AL   2,892,907
SWITCHING SYSTEM
Filed Jan. 19, 1956                                    2 Sheets-Sheet 2
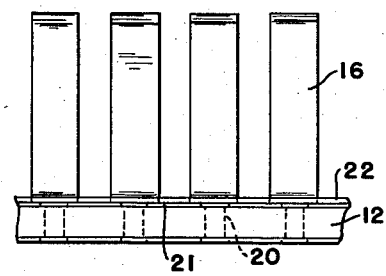
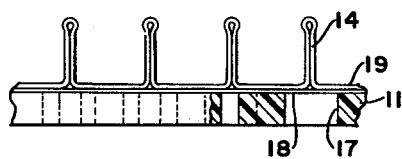
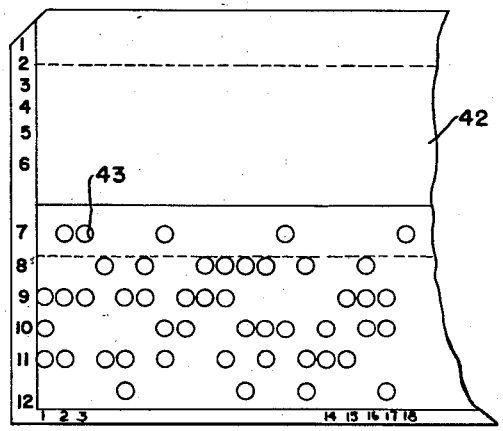
INVENTORS
WILLIAM F. RICHMOND JR.
DAVID C. NOWACK
BY
Julian C. Renfro
ATTORNEY United States Patent Office 2,892,907
Patented June 30, 1959

2,892,907

SWITCHING SYSTEM

William Frank Richmond, Jr., Joppa, and David Carl Nowack, Overlea, Md., assignors to The Martin Company, a corporation of Maryland Application July 19, 1956, Serial No. 598,876

24 Claims. (Cl. 200—46)

The present invention relates to switching apparatus, and has particular reference to a novel and improved arrangement for use in selectively and simultaneously effecting a substantial plurality of electrical circuit connections in an apparatus having a large number of possible combinations of such connections.

Although the invention has many applications, it may be employed to particular advantage in the controlling of automatic electrical computing machines, for example, and for the purposes of explanation the apparatus of the invention will be considered as forming a part of a machine of this type.

In modern automatic computing machines, information is delivered to the machine in such manner as to initiate electrical impulses or stimulii. The proper processing of such stimulii involves the routing of the electrical signal to proper components of the apparatus, and different operations usually require different routing of the electrical stimulii. Thus, the computing machines are provided with a large number of terminals, which may be connected together in a large number of combinations, according to the desired processing requirements.

Since the computing machines are generally used for a variety of purposes, involving different types of computations and different processing, it is necessary from time to time to rearrange the various terminal connections. Often, this is a time-consuming and laborious undertaking, and it is difficult to avoid errors, even though all connections are carefully checked.

To reduce the time and difficulty required in setting up the computing apparatus for a new operation, it has been heretofore proposed to provide pre-assembled patch boards, each having a number of terminal connections wired in the desired combinations. Such patch boards may be inserted in the computer for a desired operation, and then removed and filed away until the same or a similar computing problem again arises. This arrangement is not entirely satisfactory, however, since substantial time and effort is required in the making of the patch boards, and in many cases the boards are arranged for use in unique computations, and may never be reused until rewired. Moreover, filing and storage of the patch boards may present a considerable problem, due to the physical bulk of the boards, and also due to the fact that the boards must be carefully handled at all times to avoid breaking any of the connections.

The present invention avoids the difficulties heretofore encountered by providing a novel apparatus including a large number of switches and a punch-card controlled mechanism for determining the switches to be closed or opened for a particular operation. The switch mechanism remains as an integral part of the computer apparatus, and the changeover of the machine for a new type of operation is accomplished by merely inserting new punch-cards. The cards are of a conventional commercially available type, and may be easily filed and stored when not in use. When it is necessary to condition the machine for a new type of computation, a new card may be prepared by punching holes therein to provide direction for the desired switching. This may be quickly and easily done, as will be apparent, and the finished card may be visually checked for accuracy. And where a card becomes damaged through repeated use or careless handling, a duplicate card may be prepared in a few minutes.

The invention further provides an improved punch-card controlled switching mechanism in which the punch-card functions solely as a mechanical element, and is not utilized to provide electrical insulation. Thus, in the new apparatus, the punch-card is operative to determine, by mechanical operations, which of a plurality of electrical switches are to be closed or opened.

The above and other objects and advantages of the invention will be better understood by referring to the following description and accompanying drawings, in which:

Fig. 1 is a fragmentary transverse cross-sectional view of a switching system constructed in accordance with the invention;

Fig. 2 is a fragmentary cross-sectional view showing the apparatus of Fig. 1 in another operative position;

Fig. 3 is an enlarged fragmentary section view taken generally along line 3—3 of Fig. 2;

Fig. 4 is an enlarged fragmentary view, with parts broken away, of a switch contact board forming part of the apparatus of Fig. 1;

Figs. 5 and 6 are enlarged fragmentary views, with parts broken away, of the contact board shown in Fig. 4;

Fig. 7 is an enlarged fragmentary view of the contact board shown in Fig. 4; and Fig. 8 is a fragmentary view of a punch-card of the type incorporated in the apparatus of Fig. 1.

The new apparatus includes a mat assembly 10, comprising a plurality of superimposed mats 11, 12, 13 of insulating material, a plurality of fixed contact elements 14, 15 and a plurality of movable contact elements 16. The upper mat 11 has a plurality of T-shaped openings 17 therein, which are arranged in longitudinal as well as transverse rows, with the crossbar portions of the T-shaped openings aligned longitudinally. In the preferred embodiment of the invention the mat 11 has twelve openings in each transverse row and forty-five openings in each longitudinal row, or a total of five hundred forty (540) openings.

On the upper surface of the upper mat 11 there is provided a thin layer 18 of conductive material, such as copper, to which may be attached one or more spaced longitudinally disposed rows of the fixed contact elements 14. The rows of contact elements 14, in the illustrated form of the invention, comprise continuous strips 19 of copper, having flat loops therein at regular intervals forming upright contact elements. As shown in Fig. 4, the strips 19 are positioned on the upper mat 11 so that one edge of the strip passes adjacent the crossbar portions of the T-shaped openings 17. The conductive layer 18 constitutes a common ground for all of the fixed contact elements 14, and a suitable terminal means 18' are provided at the edges of the mat 11 to connect the contacts 14 with the computing machine C or other apparatus.

Alternately, some or all of the fixed contact elements 14 may be insulated from each other, so that a number of separate and independent contacts are afforded. In such case, the conductive ground layer 18 will be removed from the space between contacts 14, leaving sufficient area for the attachment of contacts 14, through individual external connections similar to 18', to the computing machine C or other processing apparatus.

As indicated in Figs. 3 and 4, the conductive layer 18 is recessed from the edges of the T-shaped openings 17. This prevents contact between the layer 18 and other contact elements of the assembly, as will appear.

The center mat 12 is provided with transversely and longitudinally aligned rows of openings 20 which, in the assembled mat structure, underlie the stem portions of the T-shaped openings of the upper mat 11. Alongside each of the longitudinal rows of openings 20 is a printed strip 21 of conductive material, upon the upper surface of which is mounted a longitudinally disposed contact strip 22. Each of the strips 22 has a plurality of spaced tabs which are bent upwardly to form the movable contact elements 16. The printed strips 21 and contact strips 22 are positioned alongside the openings 20, with the contact elements 16 projecting upwardly through the crossbar portions of the T-shaped openings 17.

In accordance with the invention, the contact elements 16 have properties of resilience, as well as conductivity, and are arranged to normally lie in a substantially vertical position. The portions of the elements 16 exposed above the top mat 11 are deformed first in one direction and then in the other, and in the rows of elements 16 adjacent the fixed contacts 14, one of the deformed portions 16a of each contact element 16 will make mechanical contact with the adjacent fixed contact element 14. Thus, each of the pairs of contacts 14 and 16 constitutes a normally closed switch. In the illustrated apparatus, one side of each of these switches is connected to a common ground, through the conductive ground layer 18. In the alternate arrangement all switches, or at least selected ones thereof, will be electrically isolated, so that special circuit arrangements may be provided.

On the lower surface of the center mat 12, or on the upper surface of the lower mat 13, there is provided a conductive layer 23, forming a shield. The shield may be grounded in any suitable manner to prevent the build-up of undesirable electrical charges between the mats 12, 13.

The lower mat 13 is provided with openings 24, aligned in longitudinal and transverse rows and arranged to register with corresponding openings 20 in the center mat 12. Alongside each transverse row of openings 24 is a transverse strip 28 of conductive material, which may be printed or applied in any other suitable manner. In contact with the lower surface of each conductive strip 28 is a contact strip 29 having a plurality of spaced tabs which are bent upright, in the form of partial loops, to form the fixed contact elements 15.

As shown in Fig. 4, for example, the contact elements 15 extend upwardly through the registered corresponding openings of the lower and center mats 13, 12, and through the stem portions of the T-shaped openings 17 in the upper mat 11. The contact elements 15 are positioned generally at right angles with respect to the movable elements 16, and one edge of each element 15 lies close to but spaced from the movable element 16 adjacent thereto. The arrangement is such that each pair of contact elements 15, 16 constitutes a normally open switch, and by closing selected ones of the switches any transverse contact strip 29 may be connected to any longitudinal contact strip 22. Suitable terminal means 21', 28' are provided at the edges of the mat assembly 10 so that the conductive strips 21, 28 and contact strips 22, 29 may be connected to the circuits of a computer C or other processing apparatus.

It will be observed that the movable contact members 16 project slightly above the fixed contact elements 15. A short distance below their upper ends, the elements 16 have deformed portions 16b which may be moved into contact with the elements 15 to close circuits through the pairs of contacts.

To actuate the switches 15, 16 in selected combinations, an actuator assembly 30 is provided which includes a plurality of actuator pins or control elements 31 extending downwardly and adapted to project below the upper ends of the movable contact elements 16. Selected ones of the pins 31 are positioned in overlapping relation with the contact elements 16, and the entire actuator assembly 30 is shifted in a transverse direction so that the projecting ends of the pins 31 engage the upper ends of the movable elements 16 and move them into contact with the associated fixed elements 15.

As shown in Figs. 1 and 2, the actuator assembly 30 includes a receiver 32 having a plurality of cylindrical recesses 33 therein which open at the lower surface of the receiver. The recesses 33 are aligned in transverse and longitudinal rows and are equal in number to the pairs of contact elements 15, 16. The upper portion of the receiver 32 is provided with a plurality of vertical bores 34 which are co-axial with the recesses 33 and open into the latter. The bores 34 slidably receive small-diameter pins 35 having enlarged head portions 36, 37 at their upper and lower ends, respectively. The lower head portions 37 are slidably received in the cylindrical recesses 33 and serve to guide the pins 35 in vertical sliding movements. The actuator pins 31 are integrally connected to the lower head portions 37 and are arranged to project downwardly from the recesses 33.

Preferably, each actuator pin 31 has a flat surface 31a which is arranged to face the adjacent movable contact element 16. To maintain the actuator pins 31 properly oriented, a retainer plate 38 is secured to the lower surface of the receiver 32 and has a plurality of openings 39 therein aligned generally with the recesses 33 but having flat sides to correspond with the flat surfaces of the pins 31.

Positioned below the retainer plate 38 is a supporting plate 40 which has a plurality of openings 41 therein aligned generally with the cylindrical recesses 33 and flat sided openings 39. The plate 40 is adapted to support a punch-card 42 of a commercially available type, substantially as indicated in Fig. 8. The punch-card 42 is of a type having twelve information rows in a transverse direction and forty-five such rows in a longitudinal direction.

In accordance with the invention, openings 43 are punched in the card at predetermined points and the card 42 is inserted between the supporting plate 40 and the retainer plate 38 while the latter is in a raised position. Where openings 43 are provided in the card 42, the openings will register with the openings 41 of the supporting plate. At all other points the openings 41 will be closed at the top.

Thus, when the assembly comprising the retainer plate 38, receiver 32, and pins 31 is lowered, the pins 31 will pass through the openings 43 in the card where the same are provided, and will engage the card at other points and be held in an elevated position. When the actuator assembly is closed in this manner, selected ones of the pins will lie adjacent movable contact elements 16 while other of the pins will be held in inoperative position. At this time the entire actuator assembly 30 is shifted in a transverse direction by means of a solenoid 44 or other suitable mechanism so that the operative ones of the pins engage the respective contact elements 16 and close them upon the associated fixed contact elements 15. This completes a plurality of desired electrical circuits, while the remaining circuits are maintained in an open condition.

It will thus be apparent that the new apparatus may be quickly readied for connecting a large number of electrical circuits in any desired combination by merely inserting a punch-card having the desired information thereon in the form of appropriately located openings. The switching elements and other electrical circuitry form a permanent part of the computing or processing apparatus and a change-over of the apparatus to condition the same for different computations or processing may be effected by merely replacing the punch-cards. This results in substantial savings of time as compared to heretofore-known arrangements which required the making of patch boards having the various desired electrical connections. The making of such patch boards involves considerable time and expense so that the use of the computing or processing apparatus with such boards is often uneconomical where the computations are unique and the boards cannot be reused.

The apparatus of the present invention is also highly advantageous in cases involving computations of a repetitive nature since the punch-cards occupy an absolute minimum of space and are ideally suited for storage and handling. Moreover, if a card becomes damaged through repeated use or careless handling the damage will be readily apparent and a duplicate card may be prepared in a matter of a few minutes. In contrast, one or more connections of a patch board might be loosened through repeated use or carless handling and the defect could easily remain undiscovered until errors were noted in the computations.

One of the more specific advantages of the apparatus resides in the mat assembly which mounts a large number of switch elements in exposed position and in aligned relation. The arrangement is such that the switch elements are readily accessible for simultaneous cleaning of all contacts with a relatively simple apparatus. A further advantage lies in the basic design of the movable contact which provides a wiping action due to its flexibility and contour.

It should be understood that the specific apparatus shown and described herein is intended to be representative only. Reference should therefore be made to the following claims in determining the full scope of the invention.

We claim:

1. A punch-card controlled switching system for selectively and simultaneously effecting a predetermined substantial plurality of electrical circuit connections in an electronics apparatus comprising a terminal mat assembly of insulating material, a relatively large number of fixed electrical contacts supported by and extending from said mat assembly, a relatively large number of movable electrical contacts supported by and extending from said mat assembly, one for each said fixed contacts, each said movable contact being disposed adjacent a fixed contact and adapted to establish an electrical connection therebetween when moved into mechanical contact relation, a carrier assembly disposed above said terminal mat spaced in substantially parallel relation and adapted to be moved transversely said mat, a relatively large number of pins, one for each said movable contacts, arranged in mutually spaced relation on said carrier assembly and adapted for separate movement therethrough toward and away from said mat, each said pin when in its down position and moved toward said mat being adapted to be positioned adjacent a movable contact, slot means in said carrier assembly adapted to receive an apertured punch-card in registered relation with said pins, each aperture provided by said punch-card permitting a certain one of the plurality of said pins to be moved into said position adjacent a movable contact, said punch-card selected lowered pins being adapted to effect electrical circuit connection between movable and fixed contacts when said carrier assembly is moved relatively to said mat, in the direction causing the selected pins to engage movable contacts and cause the same to mechnically contact fixed contacts.

2. A punch-card controlled switching system for selectively and simultaneously effecting a predetermined substantial plurality of electrical circuit connections in an electronics apparatus comprising a terminal mat assembly of insulating material, a relatively large number of pairs of individually operable switch elements supported by said mat assembly and forming a relatively large number of normally open circuit paths, a carrier assembly disposed in spaced parallel relation to said mat assembly, a relatively large number of gravity biased control elements, one for each of said pairs of switch elements, arranged in mutually spaced relation on said carrier assembly and adapted for separate movement therethrough toward and away from said mat assembly, said control elements being electrically independent of the circuit paths of said switch elements; each said control element when in a down position in relation to said carrier assembly and moved toward said mat being adapted to be positioned adjacent a pair of switch elements, means in said carrier assembly to receive a punch-card in registered relation with said control elements, each card having apertures permitting a certain one of the plurality of said control elements to be passed through the aperture and moved into said position adjacent a movable switch element, and actuator means to move the carrier assembly in a transverse direction relative to the mat assembly causing the punch-card selected lowered control elements to close the current paths formed by the pairs of switch elements adjacent the selected lowered control elements.

3. A switching system for selectively and simultaneously effecting a predetermined substantial plurality of electrical circuit connections in an electronics apparatus comprising a terminal mat assembly of insulating material, a relatively large number of circuit elements supported by said mat assembly, a carrier assembly disposed adjacent said mat assembly but being physically separated from said mat assembly as well as being electrically independent thereof, a relatively large number of control elements supported by said carrier assembly in mutually spaced relation and adapted for separate movement therethrough toward and away from said mat assembly, the end of each said control element nearest said mat assembly having a circuit element actuating portion, the other end of each control element extending above said carrier assembly when said control element is moved away from said mat assembly, the circuit element actuating portion of each said control element when moved toward said mat assembly being positioned near a pair of said circuit elements for bringing about electrical contact between said circuit elements, an information-bearing member received in said carrier assembly in registered relation with said control elements and having openings therein permitting movement of selected ones of said control elements toward said mat and means for moving said carrier assembly relative to said mat while maintaining it physically separated therefrom to carry the selected ones of said control elements into position for effecting the completion of current paths between selected pairs of said circuit elements, whereby the positions of non-selected control elements are revealed by the pattern of the ends extending above said carrier assembly, enabling comparison with a desired pattern.

4. The switching system of claim 3, further characterized by said information-bearing member comprising a punch-card, and said control elements comprising pins adapted to be received in the openings in said punch-card.

5. The switching system of claim 3, further characterized by said circuit elements comprising switches supported by said terminal mat assembly and adapted to be actuated by the selected ones of said control elements.

6. The switching system of claim 5, further characterized by each of said switches comprising a pair of contact elements supported in spaced relation by said mat assembly, each of said selected control elements being adapted to engage at least one contact element of a pair thereof and to mechanically move the said one contact element into contact with the other contact element of the pair whereby to effect a direct electrical connection between the elements of such pair.

7. A punch-card controlled switching system for selectively and simultaneously effecting a predetermined substantial plurality of electrical circuit connections in an electronics apparatus comprising a terminal mat assembly of insulating material, a relatively large number of pairs of conductor elements supported by said mat assembly, a carrier assembly positioned adjacent said mat assembly, a relatively large number of gravity biased control elements, one for each of said pairs of conductor elements, arranged in mutually spaced relation in said carrier assembly and adapted for separate movement therein between elevated and lowered positions, said control elements being adapted when in a lowered position with respect to said carrier assembly to effect the completion of current paths through said pairs of conductor elements, means including a punch-card for selecting certain ones of said control elements for the lowered position with respect to said carrier assembly, and means independent of said punch-card for moving the selected ones of said control elements into a position for completing current paths through certain pairs of said conductor elements, the direction of movement of said control elements being perpendicular to their principal axes, said movement taking place without affecting the pressure of the non-selected control elements on the punch-card.

8. The switching system of claim 7, further characterized by said control elements comprising pins slidably received in said carrier assembly and adapted to be received in apertures in said punch-card.

9. A switching system for selectively and simultaneously effecting a predetermined substantial plurality of electrical circuit connections in an electronics apparatus comprising a laminar terminal mat assembly that includes at least two current conducting laminae separated by insulating material, a relatively large number of pairs of conductor elements supported by said mat assembly with each element of each pair of elements being connected to one or the other of said current conducting laminae, a carrier assembly disposed adjacent said mat assembly, a relatively large number of control elements, one for each of said pairs of conductor elements, mounted in said carrier assembly and adapted for separate movement therein between operative and inoperative positions, means to complete current paths through said pairs of conductor elements including said control elements, an information-bearing member removably received in said carrier assembly and adapted to permit movement of selected ones of said control elements into operative positions and means independent of the information-bearing member for moving the operative ones of said control elements into positions for effecting the completion of current paths through selected pairs of said conductor elements.

10. The switching system of claim 9, further characterized by said information-bearing member comprising a punch-card having a plurality of openings therein for selecting said control elements, said current paths being electrically independent of said punch-card and control elements.

11. A punch-card controlled actuator mechanism for selectively and simultaneously effecting a predetermined substantial plurality of control operations comprising a carrier assembly, a plurality of control elements supported by said carrier assembly in mutually spaced relation and individually movable therein between inoperative positions and operative positions projecting from said carrier assembly, slot means in said carrier assembly for receiving an apertured punch-card in registered relation with said control elements, each aperture provided by said punch-card permitting a certain one of the plurality of said control elements to be moved into an operative position, and actuator means to move said carrier assembly and control elements as a unit to carry the punch-card selected operative control elements into position for effecting control operations, said control elements comprising pins movable in said carrier assembly in the direction of their principal axes, and said actuator means comprising means to move said carrier assembly transversely of the direction of said principal axes.

12. A switching system for selectively and simultaneously effecting a predetermined substantial plurality of control operations in an electronics apparatus comprising a terminal mat assembly of insulating material, a relatively large number of conductor elements supported by said mat assembly in groups wherein each of said groups contain a plurality of the conductor elements, a carrier assembly disposed adjacent said mat assembly but being physically separated from said mat assembly as well as being electrically independent thereof, a relatively large number of gravity biased control elements, one for each of said groups of conductor elements, mounted in said carrier assembly and adapted for separate movement therein between operative and inoperative positions, means including said control elements to switch the current paths through said groups of conductor elements while remaining electrically distinct therefrom, an information-bearing member removably received in said carrier assembly and adapted to permit movement of selected ones of said control elements into operative positions and means independent of the information-bearing member for moving the operative ones of said control elements into positions for switching the current path in selected groups of said conductor elements.

13. The switching system of claim 12 further characterized by said information-bearing member comprising a punch-card having a plurality of openings therein for selecting said control elements, said current paths being electrically independent of said punch-card and control elements.

14. A switching system for selectively and simultaneously effecting a predetermined substantial plurality of electrical circuit connections in an electronics apparatus comprising a terminal mat assembly of insulating material, a relatively large number of circuit elements supported by said mat assembly, a carrier assembly disposed adjacent said mat assembly, a relatively large number of control elements supported by said carrier assembly in mutually spaced relation and adapted for separate movement therethrough toward and away from said mat assembly, each said control element when moved toward said mat assembly being positioned near a pair of said circuit elements, said circuit elements comprising a plurality of switching devices mounted on said mat assembly and each positioned in longitudinally and transversely offset relation to a control element, an information-bearing member received in said carrier assembly in registered relation with said control elements and having openings therein permitting movement of selected ones of said control elements toward said mat, the selected control elements being adapted for longitudinal movement in said carrier assembly toward said mat assembly and into transversely offset relation to adjacent switching devices, and means for moving said carrier assembly relative to said mat to carry the selected ones of said control elements into position for effecting the completion of current paths between selected pairs of said circuit elements.

15. The switching system as defined in claim 9 including a shielding layer disposed between said conducting laminae and insulated therefrom.

16. In a switching system for selectively effecting a predetermined substantial plurality of electrical circuit connections in an electronics apparatus, a laminar terminal mat assembly that includes at least two current conducting laminae separated by insulating material, a relatively large number of groups of switch elements defining switches supported by and extending from said mat assembly, with elements of said switches connected to portions of said current conducting laminae, and actuating means electrically independent of said switch elements for selectively controlling electrical contact between certain of said switch elements in order to effect desired circuit conditions between portions of said laminae.

17. The arrangement as defined in claim 16 in which at least some of the switch elements associated with a current conducting laminae are grouped into a row formed of a single strip, thereby reducing the number of necessary electrical connections to said terminal mat assembly.

18. The arrangement as defined in claim 16 in which said switch elements are arranged in columns and rows, with at least some of the switch elements associated with one current conducting laminae being grouped into a column formed by a single strip, and at least some of the switch elements associated with the other current conducting laminae being grouped into a row formed of a single strip, thereby reducing the number of necessary electrical connections to said terminal mat assembly.

19. The switching system as defined in claim 16 in which a shielding layer is disposed between said conducting laminae and insulated therefrom.

20. In a switching system for selectively effecting a predetermined substantial plurality of electrical circuit connections in an electronics apparatus, a laminar terminal mat assembly that includes at least two current conducting laminae separated by insulating material, a relatively large number of groups of electrical switch elements supported by and extending from said mat assembly, each group having at least three elements, connected to different portions of said current conducting laminae, with at least one of said elements of each group being movable to control electrical contact with at least one other element of the group, and actuating means electrically independent of said switch elements for selectively controlling electrical contact between a movable element, and at least one other element of the respective group in order to effect desired circuit conditions between said laminae.

21. The system as defined in claim 20 in which said mat assembly and said actuating means are sufficiently separable as to make possible rapid cleaning and inspection of said switch elements.

22. The system as defined in claim 20 in which at least some of said current conducting laminae are of printed wiring.

23. The system as defined in claim 20 in which a shielding layer is disposed between said conducting laminae and insulated therefrom.

24. The system as defined in claim 20 in which said actuating means includes a carrier asesmbly in which are disposed a relatively large number of control elements, movable between operative and inoperative positions therein, said carrier assembly being constructed to receive an information-bearing member in registered relation with said control elements, and having means thereon enabling movement of selected ones of said control elements into said operative position, said carrier assembly being disposed in spaced, parallel relation with respect to said terminal mat, and movable with respect thereto so as to bring about the engagement of selected control elements with movable switch elements and cause the same to control electrical contact with other switch elements.

References Cited in the file of this patent

UNITED STATES PATENTS

| | | |
|---|---|---|
| 2,682,581 | Roggenstein | June 29, 1954 |
| 2,782,275 | Vance | Feb. 19, 1957 |